United States Patent [19]

Buss et al.

[11] Patent Number: 4,769,064
[45] Date of Patent: Sep. 6, 1988

[54] METHOD FOR SYNTHESIZING ULTRAFINE POWDER MATERIALS

[75] Inventors: Richard J. Buss; Pauline Ho, both of Albuquerque, N. Mex.

[73] Assignee: The United States of America as represented by the United States Department of Energy, Washington, D.C.

[21] Appl. No.: 146,628

[22] Filed: Jan. 21, 1988

[51] Int. Cl.$^4$ ............................................. B22F 9/14
[52] U.S. Cl. ........................ 75/0.5 B; 75/0.5 BA; 75/0.5 BB; 75/0.5 BC; 204/164; 204/177; 423/344; 501/97
[58] Field of Search ........... 75/0.5 B, 0.5 BB, 0.5 BC; 204/164; 501/97; 423/344; 204/177

[56] References Cited

U.S. PATENT DOCUMENTS

| 3,444,061 | 5/1969 | Hellund | 204/164 |
| 3,775,621 | 11/1973 | Gorin | 204/164 |
| 3,814,893 | 6/1974 | Weissfloch et al. | 315/39 |
| 4,138,306 | 2/1979 | Niwa | 156/345 |
| 4,206,190 | 6/1980 | Harvey, II | 423/344 |
| 4,262,631 | 4/1981 | Kubacki | 204/164 |
| 4,399,115 | 8/1983 | Sato et al. | 423/344 |
| 4,568,437 | 2/1986 | Dickson, Jr. | 204/164 |
| 4,610,857 | 9/1986 | Ogawa et al. | 423/335 |

OTHER PUBLICATIONS

Vogt et al., "Thermal Plasma Chemical Synthesis of Powders", Electrochemical Society, High Temperature Materials Chemistry III, Oct. 13–18, 1985, Los Alamos Report LA-UR-85-3495.

Primary Examiner—Wayland Stallard
Attorney, Agent, or Firm—Armand McMillan; James H. Chafin; Judson R. Hightower

[57] ABSTRACT

A method for synthesizing ultrafine powder materials, for example, ceramic and metal powders, comprises admitting gaseous reactants from which the powder material is to be formed into a vacuum reaction chamber maintained at a pressure less than atmospheric and at a temperature less than about 400° K. (127°C.). The gaseous reactants are directed through a glow discharge provided in the vacuum reaction chamber to form the ultrafine powder material.

17 Claims, 1 Drawing Sheet

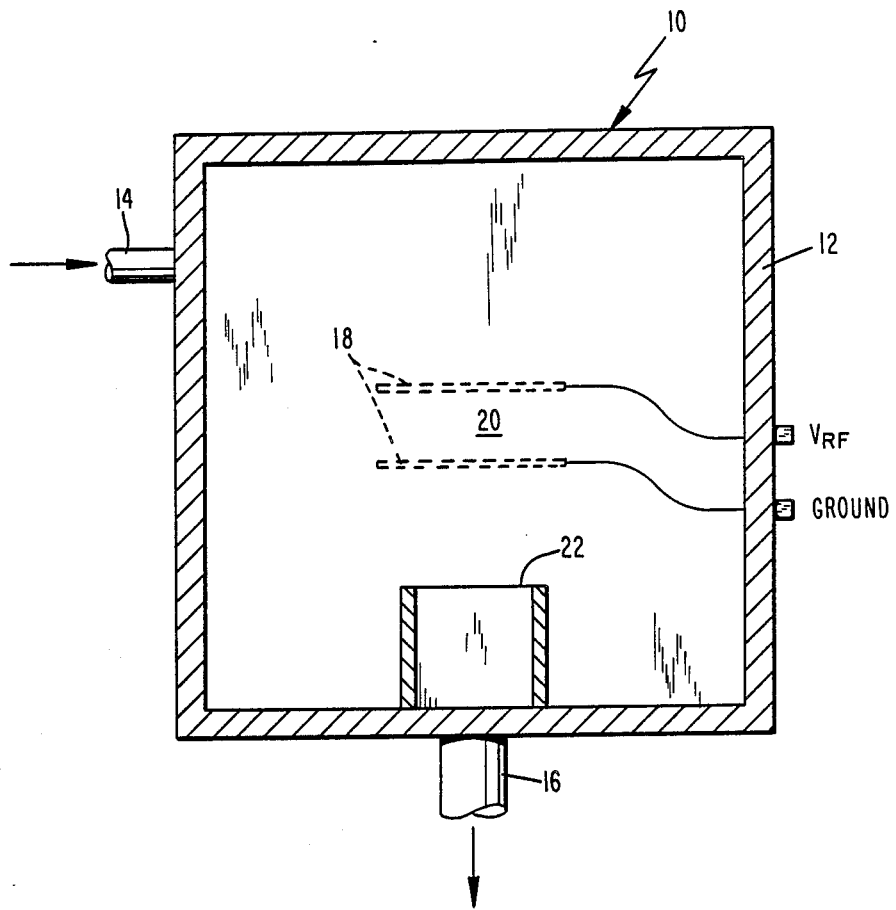

METHOD FOR SYNTHESIZING ULTRAFINE POWDER MATERIALS

The United States Government has rights in this invention pursuant to Contract No. DE-AC04-76DP00789 between the United States Department of Energy and AT&T Technologies, Inc.

FIELD OF THE INVENTION

The present invention relates to a method for synthesizing ultrafine powder materials, for example, ceramic and metal powders, from gaseous reactants. More particularly, the present invention relates to a method for synthesizing ultrafine powder materials using a glow discharge.

BACKGROUND OF THE INVENTION

Ultrafine powder materials, particularly ceramic and metal powders, are advantageous for forming sintered products for use in high temperature applications. Accordingly, an inexpensive and reliable method for producing ultrafine powder materials is desired. Thermal plasma methods are known for preparing ultrafine powder materials as set forth in "Thermal Plasma Chemical Synthesis of Powders", Vogt et al, presented at 168th Meeting of the Electrochemical Society, Oct. 13-18, 1985. Generally, the high temperature thermal plasma methods employ high powder levels, for example, 1 to $10^3$ kW, and temperatures of at least several thousand degrees Kelvin (°K.), and usually of about 5000° K. The Ogawa et al U.S. Pat. No. 4,610,857 discloses a modified thermal plasma method for forming ultrafine ceramic particles wherein a metal powder is vaporized and mixed with a reactive gas to form the ultrafine particles. The Niwa U.S. Pat. No. 4,138,306 discloses a film forming method wherein reaction gases are subjected to a high temperature microwave plasma. However, the high temperature and high power requirements of the thermal plasma methods place limitations on the physical and chemical properties of the powders produced.

On the other hand, glow discharge apparatus employ lower energy and temperature requirements as compared with the high temperature thermal plasma powder generating apparatus. Glow discharge has been used in various applications, for example, for gas phase reaction chemistry as disclosed in the Dickson, Jr. U.S. Pat. No. 4,568,437 and the Hellund U.S. Pat. No. 3,444,061, for the deposition of film layers as disclosed in the Kubacki U.S. Pat. No. 4,262,631, and for treatment of solid materials as disclosed in the Gorin U.S. Pat. No. 3,775,621. The Weissfloch et al U.S. Pat. No. 3,814,983 discloses a further method for treating materials using microwave generated plasmas. However, no methods are known for the production of ultrafine powders using glow discharge.

Thus, a need exists for a method of producing ultrafine powder materials economically and in large quantities.

SUMMARY OF THE INVENTION

It is therefore an object of the present invention to provide a method for synthesizing ultrafine powder materials, particularly ceramic and metal powder materials. It is a further object of the invention to provide a method for synthesizing ultrafine powder materials, which method requires lower temperatures and power requirements as compared with known methods, particularly as compared with thermal plasma methods for producing ultrafine powders. It is an additional object of the invention to provide a method for synthesizing ultrafine powder materials which is readily adaptable for producing large quantities of the powder materials.

These and additional objects are provided by the method of the present invention. More particularly, the present invention relates to a method for synthesizing ultrafine powder materials wherein gaseous reactants from which the powder material is to be formed are admitted into a vacuum reaction chamber which is maintained at a pressure less than atmospheric and at a temperature less than about 400° K. (127° C.). The gaseous reactants are directed through a glow discharge provided in the vacuum reaction chamber to form the ultrafine powder material. Generally, as compared with the known thermal plasma methods, the method for synthesizing ultrafine powder materials according to the present invention employs decreased gas pressure, temperature and power requirements. Generally, the method results in the formation of ultrafine powder materials having an amorphous structure, which powder materials are particularly adapted for sintering to provide dense products for high temperature applications.

These and additional advantages of the method according to the present invention will be more apparent in view of the following detailed description.

DESCRIPTION OF THE DRAWING

The following detailed description may be more clearly understood in view of the accompanying FIGURE which discloses a schematic view of an apparatus suitable for practicing the method of the present invention.

DETAILED DESCRIPTION

The present invention provides a method for synthesizing ultrafine powder materials. The method is particularly suitable for synthesizing ultrafine ceramic powder, ultrafine metal powder, and mixtures of ultrafine ceramic and metal powders. Generally, the method may be used for synthesizing powder materials which have conventionally been produced by the high temperature thermal plasma methods known in the art. This method may also be used to produce ultrafine powders of materials which have conventionally been deposited as thin films by glow discharge methods known to the art. Preferred ultrafine powder materials produced according to the method of the present invention include silicon nitride, amorphous hydrogenated silicon, amorphous hydrogenated carbon, and tungsten powder materials.

The method according to the present invention synthesizes the ultrafine powder materials from gaseous reactants. The gaseous reactants which are required for producing a particular powder material will be apparent to one of ordinary skill in the art. For example, silicon nitride ultrafine powder may be produced from gaseous reactants consisting essentially of silane and ammonia. Amorphous hydrogenated carbon ultrafine powder may be produced from a gaseous reactant consisting essentially of acetylene gas. Tungsten metal ultrafine powder may be produced according to the method of the present invention from gaseous reactants consisting essentially of tungsten hexafluoride and hydrogen gas. Likewise, other ultrafine powder materials may be produced from their gaseous reactants using the method according to the present invention.

The method of the present invention is particularly adapted for synthesizing ultrafine powder. Generally, ultrafine powder materials produced according to the method of the present invention have an average particle diameter less than about 2000 Å. In most cases, the method according to the present invention results in the synthesis of ultrafine powder materials having an average particle size of less than about 500 Å. Additionally, the method of the present invention generally provides ultrafine powder materials of an amorphous character, and the amorphous ultrafine powders can provide superior sintering characteristics, particularly as compared with powders having mixed crystalline and amorphous characteristics.

The method of the invention comprises admitting the gaseous reactants from which the powder material is to be formed into a vacuum reaction chamber. FIG. 1 discloses a schematic view of an apparatus 10 for use in practicing the method of the present invention. With reference to FIG. 1, the vacuum reaction chamber 12 may be formed of any material which can withstand the temperature and pressure requirements of the present method. In view of the relatively low temperature and pressure requirements of the present method, aluminum is a suitable material for the vacuum reaction chamber. The gaseous reactants are admitted to the chamber via an inlet means 14 and a vacuum is created via a mechanical or other pump (not shown) in communication with outlet 16.

As compared with the temperature and pressure conditions employed in conventional high temperature thermal plasma methods for producing powder materials, the method according to the present invention employs a significantly lower temperature and a decreased gas pressure. More specifically, the vacuum reaction chamber is maintained at a pressure less than atmospheric and at a temperature less than about 400° K. (127° C.). In a preferred embodiment, the reaction chamber is maintained at a pressure greater than about 200 mTorr, and more preferably at a pressure of about 500 mTorr.

In accordance with an important feature of the invention, the gaseous reactants which are admitted to the vacuum reaction chamber are directed through a glow discharge which is provided in the chamber in order to form the ultrafine powder material. Preferably, the glow discharge is generated through radio frequency energy, as is well known in the art, and at a frequency of approximately 13.56 Megahertz. The glow discharge may be generated using at least two electrodes arranged to form a parallel plate capacitor with one electrode grounded and the other supplied with the radio frequency energy. With reference to the FIGURE, the method according to the present invention is advantageously practiced using a pair of screen electrodes 18 made from high transmittance screen. Other electrode arrangements may also be used. A non-equilibrium plasma glow discharge is generated between the electrodes. As the gaseous reactants are directed through the plasma glow discharge, the ultrafine powder material is formed. The area in which the glow discharge plasma is formed is designated 20 in the FIGURE. In a preferred embodiment, the average power density of the glow discharge is about 0.05 watts/cc, which is significantly lower than that required in the conventional high temperature thermal plasma methods for producing powder materials.

In a preferred embodiment, the method according to the present invention includes the additional step of collecting the ultrafine powder material which is produced in the glow discharge. As shown in the FIGURE, collection of the ultrafine powder material may be affected using a filter member such as a screen 22 arranged below the glow discharge and between the glow discharge and the vacuum source. Because the temperature employed in the method of the present invention is relatively low, external cooling is not generally required.

The method of the present invention is specifically demonstrated in the following examples.

EXAMPLE 1

This example demonstrates the use of the method according to the present invention for synthesizing ultrafine tungsten metal powder material. Gaseous reactants consisting essentially of tungsten hexafluoride and hydrogen gas in a ratio of 1 to 7 were admitted to a vacuum reaction chamber generally as set forth in the FIGURE and maintained at a pressure of about 500 mTorr and a temperature less than 400° K. at a linear flow rate of 1 cm/sec. The reactant gases were directed through a glow discharge generated using two electrodes made from high transmittance screen and arranged to form a parallel plate capacitor with one electrode grounded and the other electrode connected to a radio frequency power supply of 13.56 Megahertz. A non-equilibrium plasma was generated between the plates. Powder formed in the plasma was collected in a filter arranged beneath the plasma. The resultant ultrafine tungsten powder had an average particle size of 100 Å.

EXAMPLE 2

The general procedure set forth in Example 1 was followed except that the gaseous reactants consisted essentially of a mixture of silane and ammonia. The resultant powder material comprised an amorphous silicon nitride powder exhibiting an average particle size of approximately 300 Å.

EXAMPLE 3

The general procedure of Example 1 was followed except that the gaseous reactants consisted essentially of pure acetylene gas. The resultant ultrafine powder material consisted of amorphous hydrogenated carbon having an average particle size of approximately 100 Å.

The preceding examples are set forth to illustrate specific embodiments of the invention and are not intended to limit the scope of the methods of the present invention. Additional embodiments and advantages within the scope of the claimed invention will be apparent to one of ordinary skill in the art.

What is claimed is:

1. A method for synthesizing ultrafine powder material from gaseous reactants, comprising (a) admitting gaseous reactants from which the powder material is formed into a vacuum reaction chamber maintained at a pressure less than atmospheric and at a temperature less than about 400° K., and directing the gaseous reactants through a glow discharge provided in the vacuum reaction chamber to form the ultrafine powder material.

2. A method as defined by claim 1, wherein the reaction chamber is maintained at a pressure greater than about 200 mTorr.

3. A method as defined by claim 1, wherein the reaction chamber is maintained at a pressure of about 500 mTorr and a temperature of less than about 400° K.

4. A method as defined by claim 1, wherein the glow discharge is generated through radio frequency energy.

5. A method as defined by claim 4, wherein the radio frequency energy is at a frequency of approximately 13.56 Megahertz and the average power density is about 0.05 watts/cc.

6. A method as defined by claim 1, including the additional step of collecting the ultrafine powder material produced in the glow discharge.

7. A method as defined by claim 6, wherein the ultrafine powder material is collected on a filter member arranged between the glow discharge and the vacuum source.

8. A method as defined by claim 1, wherein the ultrafine powder material has an average particle diameter of less than about 2000 Å.

9. A method as defined by claim 8, wherein the ultrafine powder material has an average particle size of less than about 500 Å.

10. A method as defined by claim 1, wherein the ultrafine powder material comprises a ceramic powder.

11. A method as defined by claim 1, wherein the ultrafine powder material comprises a metal powder.

12. A method as defined by claim 1, wherein the gaseous reactants consist essentially of silane and ammonia and the ultrafine powder material consists essentially of silicon nitride powder.

13. A method as defined by claim 12, wherein the silicon nitride powder is amorphous.

14. A method as defined by claim 1, wherein the gaseous reactants consist essentially of tungsten hexafluoride and hydrogen and the ultrafine powder material consists essentially of tungsten powder.

15. A method as defined by claim 14, wherein the flow ratio of tungsten hexafluoride to hydrogen into the reaction chamber is about 1:7.

16. A method as defined by claim 1, wherein the gaseous reactants consist essentially of acetylene and the ultrafine powder material consists essentially of amorphous hydrogenated carbon.

17. The ultrafine powder material prepared according to the method of claim 1.

* * * * *